United States Patent
Chao et al.

(10) Patent No.: US 7,711,223 B2
(45) Date of Patent: *May 4, 2010

(54) COMPOSITE LIGHT GUIDING FILM MODULE

(75) Inventors: Chih-Chiang Chao, Taipei (TW); Po-Ling Shiao, Hsinchu (TW); Yu-Tsan Tseng, Taoyuan (TW); Mei-Chun Lai, Miaoli (TW)

(73) Assignee: Industrial Technology Research Institute, Hsinchu (TW)

( * ) Notice: Subject to any disclaimer, the term of this patent is extended or adjusted under 35 U.S.C. 154(b) by 38 days.

This patent is subject to a terminal disclaimer.

(21) Appl. No.: 12/053,526

(22) Filed: Mar. 21, 2008

(65) Prior Publication Data

US 2009/0142021 A1  Jun. 4, 2009

(30) Foreign Application Priority Data

Dec. 3, 2007  (TW) ............................... 96145897 A

(51) Int. Cl.
| | |
|---|---|
| *G02B 6/34* | (2006.01) |
| *G02B 6/26* | (2006.01) |
| *G02B 6/42* | (2006.01) |
| *G02B 6/32* | (2006.01) |
| *G02B 5/02* | (2006.01) |
| *G02B 13/20* | (2006.01) |
| *F21V 5/00* | (2006.01) |
| *F21V 5/04* | (2006.01) |

(52) U.S. Cl. .............................. 385/37; 385/35; 385/31; 385/33; 359/599; 359/707; 362/330; 362/331; 362/335

(58) Field of Classification Search ................... 385/37, 385/31, 33, 35, 48; 359/599, 619, 707, 708, 359/712; 362/330, 331, 333, 335, 336
See application file for complete search history.

(56) References Cited

U.S. PATENT DOCUMENTS 5,119,235 A * 6/1992 Umeda et al. ................ 359/619

(Continued)

FOREIGN PATENT DOCUMENTS

JP  2000-249837  9/2000

(Continued)

OTHER PUBLICATIONS

"Design and fabrication of binary slanted surface-relief gratings for a planar optical interconnection," by Miller et al, Applied Optics, vol. 36, No. 23, Aug. 10, 1997, pp. 5717-5727.*

(Continued)

*Primary Examiner*—Frank G Font
*Assistant Examiner*—Robert Tavlykaev
(74) *Attorney, Agent, or Firm*—Quintero Law Office

(57) ABSTRACT

A composite light guiding film module is disclosed, which includes: a light guiding film; a light diffusion structure comprising a plurality of micro concave lenses arranged in a first direction and a second direction to form a second dimensional array and the curvature of each concave lens and the junction of the concave lenses are not equal to zero; and a refraction element comprising at least one refraction structure, wherein light from a light source passes through the refraction element and is refracted to the light diffusion structure, and the light passing through the light diffusion structure is refracted into the light guiding film and then propagates in the light guiding film by total reflection.

19 Claims, 8 Drawing Sheets

U.S. PATENT DOCUMENTS

| | | | |
|---|---|---|---|
| 5,712,694 A * | 1/1998 | Taira et al. | 349/9 |
| 5,861,990 A * | 1/1999 | Tedesco | 359/599 |
| 5,883,684 A | 3/1999 | Millikan et al. | |
| 6,033,094 A * | 3/2000 | Sohn | 362/332 |
| 6,259,854 B1 | 7/2001 | Shinji et al. | |
| 6,628,355 B1 * | 9/2003 | Takahara | 349/106 |
| 6,974,241 B2 * | 12/2005 | Hara et al. | 362/606 |
| 2004/0061440 A1 | 4/2004 | Imai et al. | |
| 2004/0136174 A1 * | 7/2004 | Yu et al. | 362/31 |
| 2004/0202441 A1 | 10/2004 | Greiner | |
| 2005/0141212 A1 * | 6/2005 | Moon et al. | 362/29 |
| 2005/0259939 A1 | 11/2005 | Rinko | |
| 2006/0262564 A1 | 11/2006 | Baba | |
| 2007/0002205 A1 * | 1/2007 | Hasei | 349/57 |

OTHER PUBLICATIONS

"Optimization of anisotropically etched silicon surface-relief gratings for substrate-mode optical interconnects," by Wu et al Applied Optics, vol. 45, No. 1, Jan. 1, 2006, pp. 15-21.*

"Continuous surface relief micro-optical elements fabricated on photographic emulsions by use of binary and halftone masks," by Navarrete-Garcia et al, optical Materials, vol. 23, 2003, pp. 501-512.*

Yourii et al."High-efficiency Slim LED Backlight System with Mixing Light Guide". SID 03 Digest, pp. 1259-1261, vol. 43.3, US.

Samuli et al. "White LED light coupling into light guides with diffraction gratings". Applied Optics, Apr. 20, 2006, pp. 2623-2630, vol. 45, No. 2, US.

Samuli et al. "A double-sided grating coupler for thin light guides". Optics Express, Mar. 5, 2007, pp. 2008-2018, Bol. 15, No. 5, US.

* cited by examiner

COMPOSITE LIGHT GUIDING FILM MODULE

BACKGROUND OF THE INVENTION

1. Field of the Invention

The invention relates to a composite light guiding film module, and in particular relates to a light guiding film module having a plurality of optical elements guiding light into a light guiding film and propagating therein.

2. Description of the Related Art

Mobile devices, such as mobile phones, PDAs, or digital cameras, have a side backlight module. Meanwhile, as smaller sizes are preferred, an extra-thin light guiding film is desired. When the light guiding film has a thickness less than 300 μm, it is difficult to direct light into the film from edges thereof. When the light source is a light emitting device (LED), light beams from the LED converge, and, therefore, can be directed into a thinner film than a cold cathode fluorescent lamp (CCFL) can. When the film is too thin, even light beams from LEDs cannot be directed into the film from edges thereof. A complicated method and system must be employed to couple light beams to the film. An application (application Ser. No. 11/950,344) of the applicant of the invention discloses a light guiding film having light diffusion structures which guides light into the light guiding film. There is light loss caused by partial penetration of the light guiding film.

BRIEF SUMMARY OF INVENTION

An embodiment of a composite light guiding film module of the invention comprises: a light guiding film comprising a light diffusion structure disposed on a first surface of the light guiding film, wherein the light diffusion structure comprising a plurality of micro concave lenses arranged in a first direction and a second direction to form a second dimensional array and the curvature of each concave lens and the junction of the concave lenses are not equal to zero; and a refraction element comprising at least one refraction structure, wherein light from a light source passes through the refraction element and is refracted to the light diffusion structure, and the light passing through the light diffusion structure is refracted into the light guiding film and then propagates in the light guiding film by total reflection.

The refraction structure comprises at least one micro concave lens, and light from the light source passes through the micro concave lens and is refracted into the light guiding film. The refraction structure faces either the light source or the light diffusion structure.

The refraction structure comprises at least one micro convex lens, and light from the light source passes through the micro convex lens and is refracted into the light guiding film.

The refraction structure comprises at least one prism, and light from the light source passes through the prism and is refracted into the light guiding film.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The larger the incident angle with respect to the light guiding film is, the more light beams can be totally reflected. As such, the composite light guiding film module of the invention comprises a refraction element above a light guiding film to refract light beams. Light is refracted by the refraction element to enter the light guiding film with a large incident angle.

Figure 1:
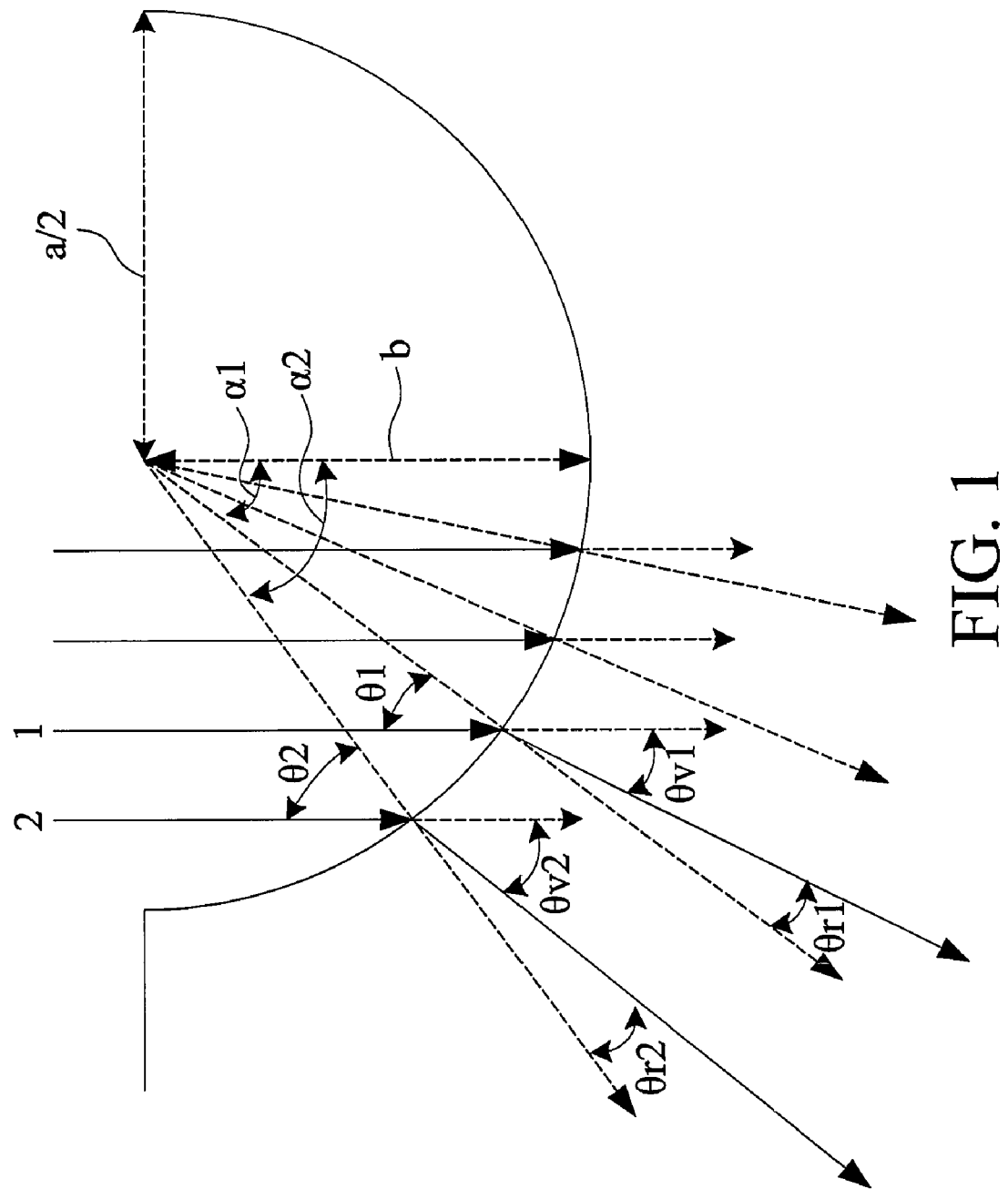
FIGS. 1 and 2 depict light passing through a micro concave lens of the invention.
Figure 2:
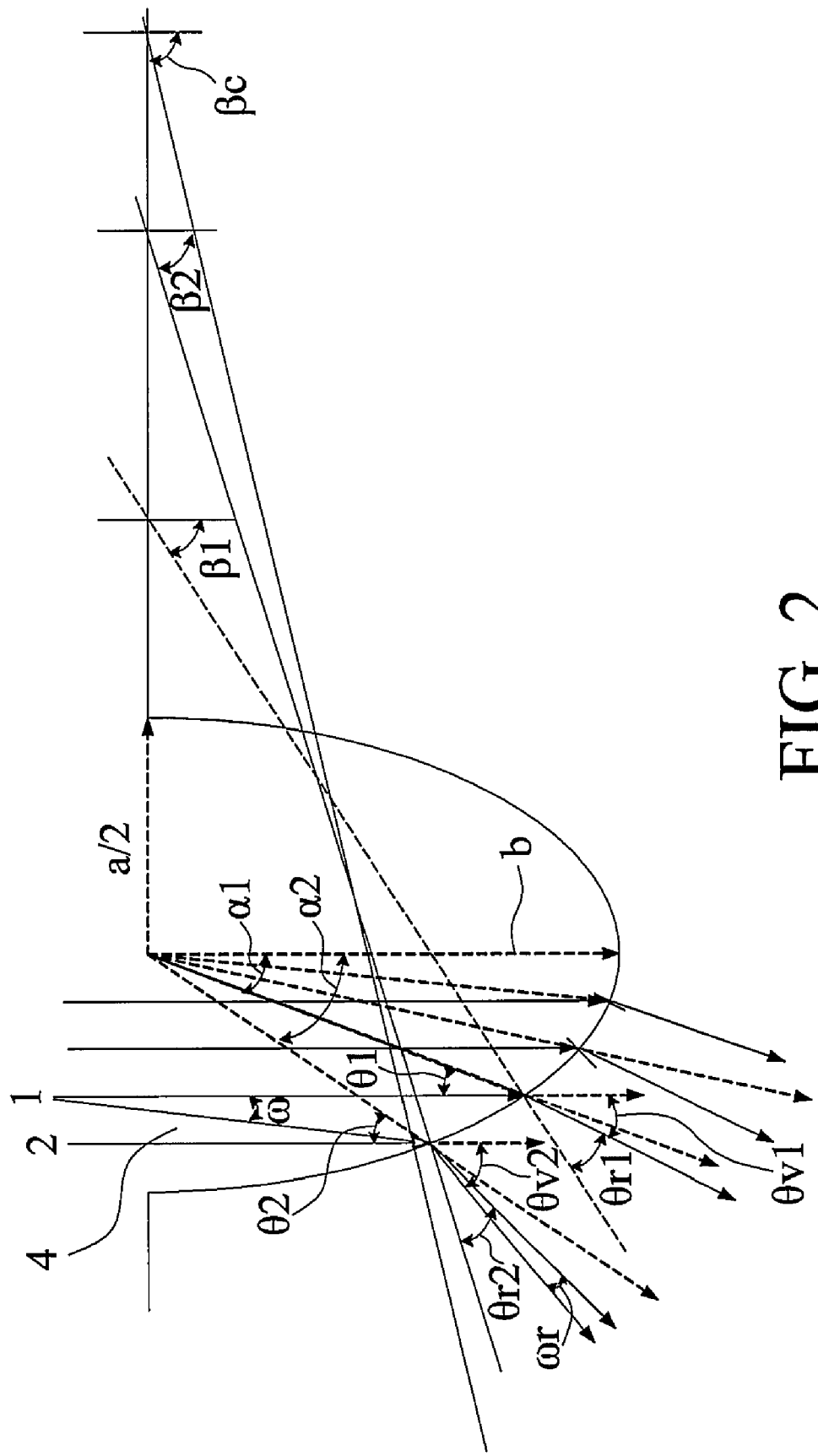

FIGS. 1 and 2 depict light passing through a micro concave lens formed as a light diffusion structure on the light guiding film. FIG. 1 depicts light passing through a micro semispherical concave lens.

Numerical symbols 1, 2 are light beams. a/2 is the radius of the micro concave lens. b is the depth of the micro concave lens. n1 is the refraction ratio of air. n2 is the refraction ratio of the micro concave lens. θ1 and θ2 are incident angle of light beams 1 and 2. θr1 and θr2 are refraction angle of light beams 1 and 2. α1 and α2 are the central angles of the light beams 1 and 2. θv1 and θv2 are view angle of the refracted light beams 1 and 2.

As the micro concave lens is a semi-sphere lens, a/2=b and the normal line passes through the center of the sphere (focus). According to Snell's law, n1×sin θ1=n2×sin θr1, α1=θ1, θv1=α1−θr1. When the micro concave lens is made of polycarbonate (PC), the light enters the micro concave lens from the air. It is known that n1=1, n2=1.59. When θ1 is 36.8°, θr1 is 22.1°, θv1=36.8°−22.1°=14.7°<38.97° (critical angle of total reflection which is calculated by the formula θc=arcsin(n2/n1), θc is the critical angle), no light is totally reflected. When θ2 is 52.9°, θr2=30.1°, and θv2=22.8°<38.97°. The light cannot be totally reflected. Theoretically, total reflection occurs only when the incident angle exceeds 77°. However, minimal amount of light exceeds the angle. The sphere lens has poor efficiency in guiding light.

FIG. 2 depicts a non-sphere lens (elliptic lens, paraboloid lens or hyperboloid lens). β1 and β2 are incident angles of the light beams 1 and 2. The depth of an elliptic lens is b, and the radius of the elliptic lens is a/2. The eccentric ratio e=(1−(a/2)²/b²)1/2. When a:b=1:1, e=0.86. β1>θ1 for the elliptic lens. α1 and α2 are the central angles of the light beams 1 and 2. When the micro concave lens is made of polycarbonate, n1=1 and n2=1.59. When β1=56.3°, β2=72.4°, according to Snell's law, 1×sin β1=1.59×sin θr1, θv1=β1−θr1=24.7°, θv2=β2−θr2=35.5°, which is very close to the critical angle θc=38.97°. If θv3 is 38.97°, βc is about 77°. Light is totally reflected by an elliptic lens with high eccentric ratio.

When the light entering the lens is deflected by an angle, for example a deflected angle •=12° for a light beam 4, β2 is reduced from 72.4° to 60.4°. By calculation, $\theta r4=33.1°$, $\theta v4=\beta 4-\theta r4=39.3°$ ($\theta v4$ is the view angle of the refracted light beam 4; $\beta 4$ is the incident angle of the light beam 4; $\theta r4$ is the refraction angle of light beams 4), which exceeds the critical angle $\theta c$. High efficiency is obtained only when the ratio a/b is not greater than 2.

As described, when light beams enter the light guiding film with a larger incident angle, the more light beams are totally reflected. The refraction element is able to direct light beams to enter the light guiding film with a larger incident angle.

Figure 3:
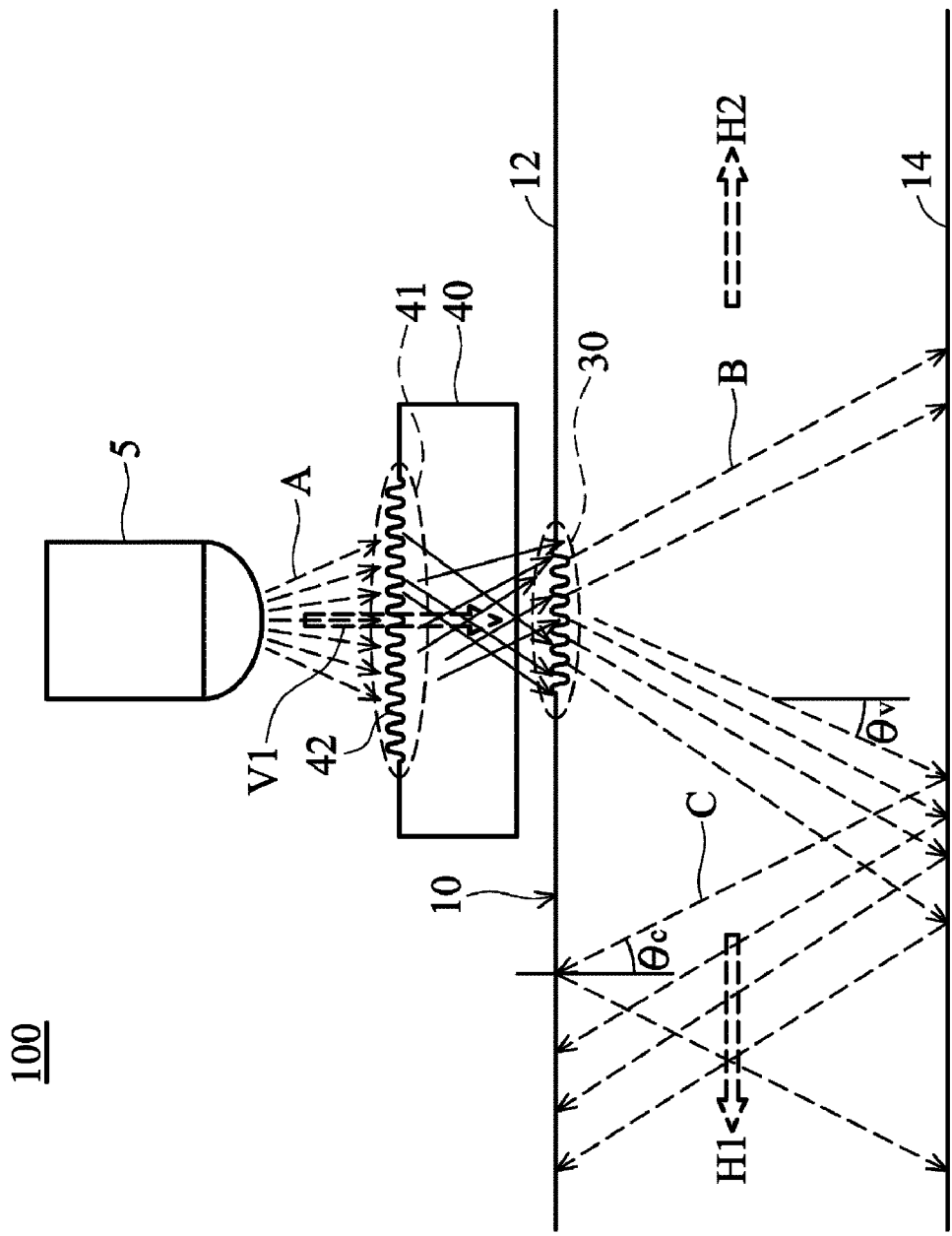
FIG. 3 is a schematic view of an embodiment of a composite light guiding film module of the invention.

Referring to FIG. 3, a composite light guiding film module 100 comprises a light guiding film 10 and a refraction element 40. The light guiding film 10 comprises a first surface 12, a second surface 14, and a light diffusion structure 30 disposed on the first surface 12. A light beam "A" from a light source 5 is refracted by the refraction element 40 to pass through the light diffusion structure 30 of the light guiding film 10. The diffused light beam "B" is reflected by the second surface 14. The reflected light beam "C" reaches the first surface 12 with an incident angle larger than the critical angle of total reflection $\theta c$ and is thus reflected by the first surface 12. The light beam propagates in the light guiding film 10 by continuous total reflection. In this way, light beams can be directed into the light guiding film 10 from a surface thereof and propagates therein. A reference symbol V1 substantially denotes a first traveling direction of the light beam traveling from the light source 5 toward/into the light diffusion structure 30 of the light guiding film 10, and two opposite reference symbols H1 and H2 substantially denote second and third traveling or propagating directions of the light beam propagating within the light guiding film 10, wherein the first traveling direction V1 is substantially perpendicular or normal to the second or third traveling direction H1 or H2.

An embodiment of the invention, the refraction element 40 is a refraction film having a refraction structure 41 comprising a plurality of micro convex lens 42. The light beam "A" is deflected by passing through the micro convex lens 42 and enters the light diffusion structure 30 of the light guiding film 10 with an angle with respect to the first surface 12, whereby the light beam "A" propagates in the light guiding film 10 by continuous total reflection.

Figure 4:
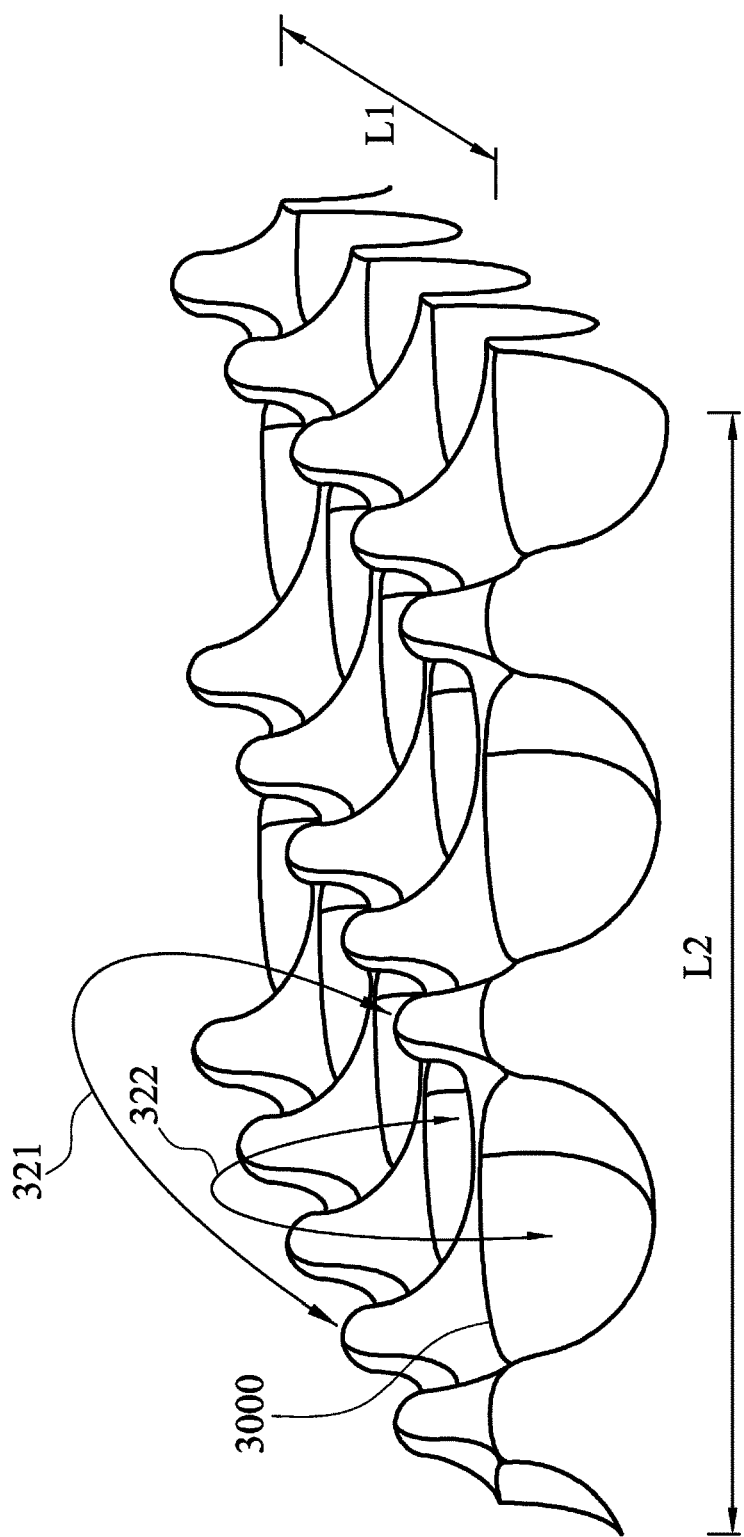
FIG. 4 is a schematic view of a light diffusion structure of the invention.

The light diffusion structure 30 comprises a plurality of micro concave lens 32 arranged in a two dimensional matrix along a first direction L1 and a second direction L2, as shown in FIG. 4. Such a structure can be made by laser dragging method. The curvature on each micro concave lens 32 and the junction of adjacent micro concave lenses are not equal to 0. The first direction L1 is substantially perpendicular to the second direction L2. The ratio of the width to the depth of each micro concave lens is not greater than 2. The depth of micro concave lens is smaller than the thickness of the light guiding film.

Figure 5:
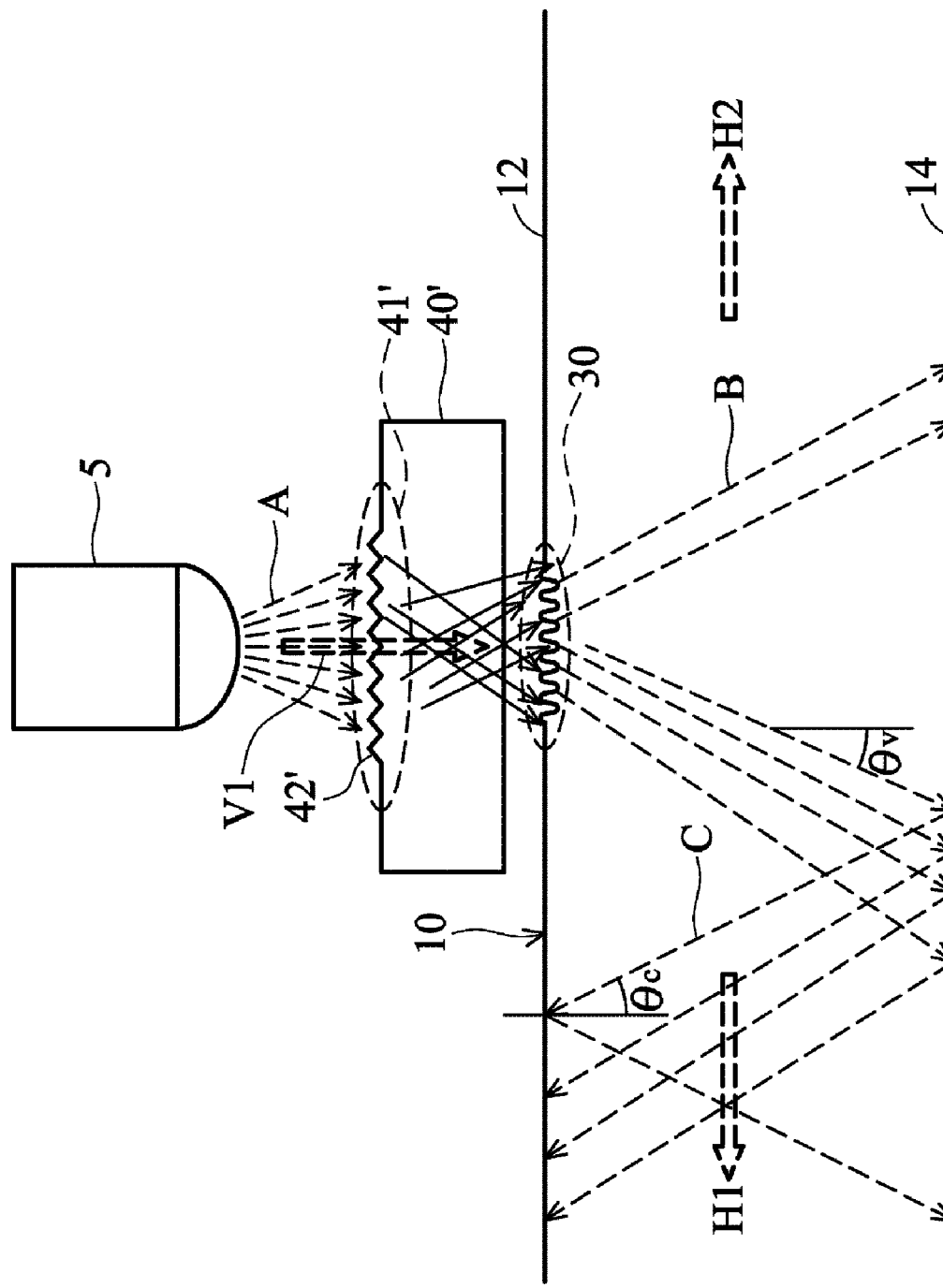
FIG. 5 is another embodiment of the composite light guiding film module of the invention.

FIG. 5 depicts another embodiment of the invention. In this embodiment, the refraction element 40' comprises at least one refraction structure 41' having a plurality of prisms 42'. The light beam "A" is also deflected by the prisms 42' by passing through it. The first traveling direction V1 of the light beam "A" traveling from the light source 5 toward/into the light diffusion structure 30 of the light guiding film 10 is substantially perpendicular or normal to the second or third traveling direction H1 or H2 of the light beam propagating within the light guiding film 10.

In addition to the embodiments, the refraction structure can also comprise a plurality of micro concave lenses or a plurality of grains distributed in the refraction element, which can also deflect light beams.

In another embodiment, the refraction element comprises only one refraction structure. Multi-layered refraction structures or multiple stacked refraction sheets are also applicable.

Figure 6:
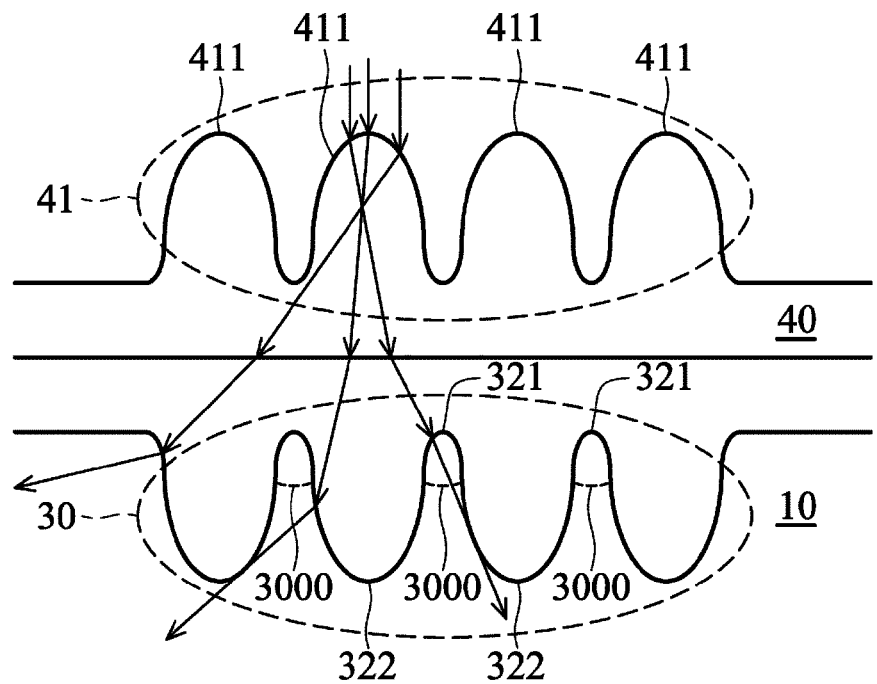
FIG. 6 depicts an optical path of micro convex lenses as a refraction structure facing a light source.
Figure 7:
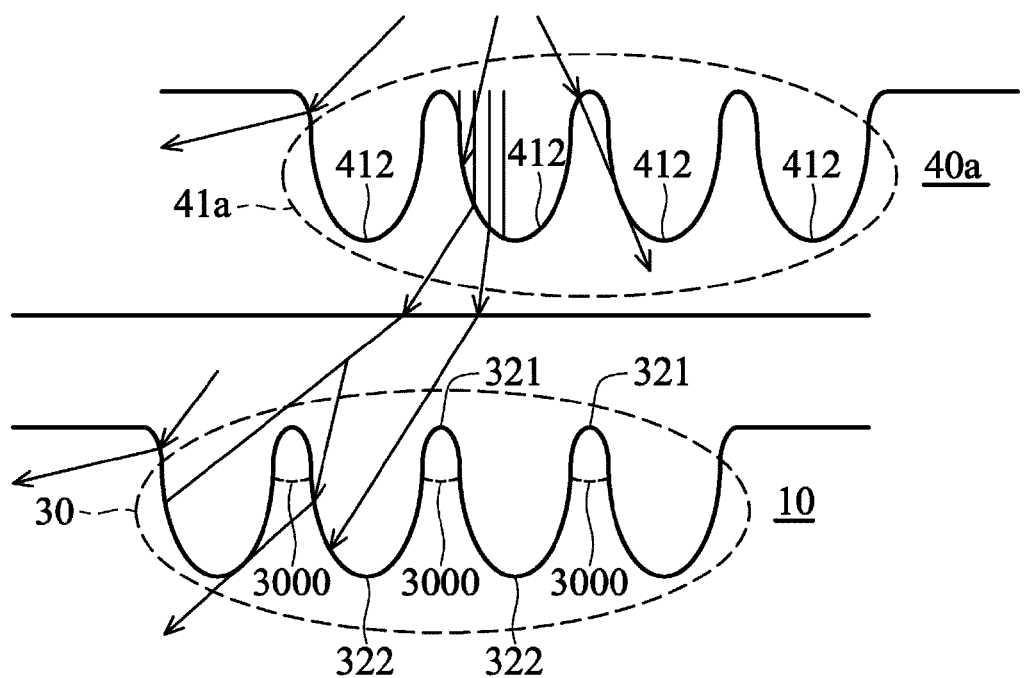
FIG. 7 depicts an optical path of micro concave lenses as a refraction structure facing a light source.
Figure 8:
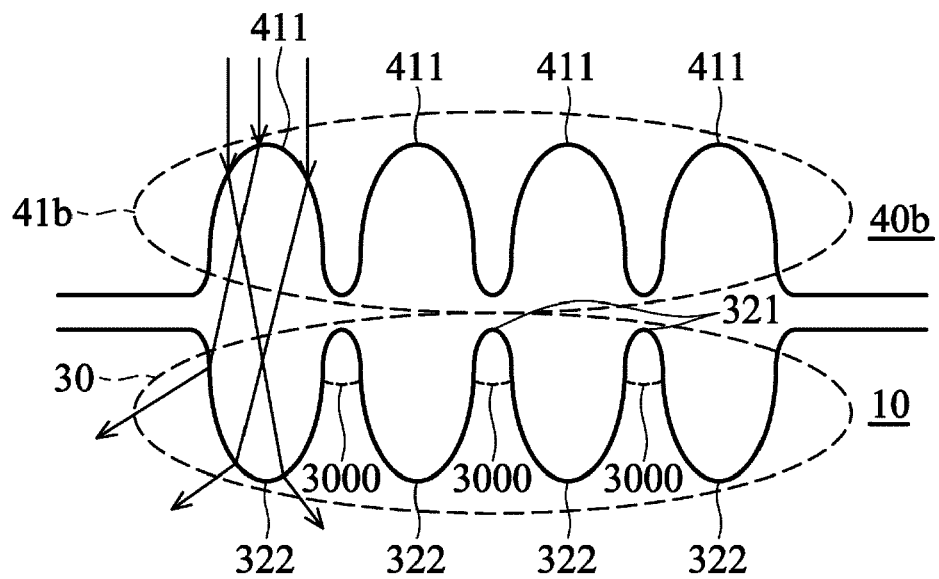
FIG. 8 depicts an optical path of micro concave lenses as a refraction structure facing a light diffusion structure.
Figure 9:
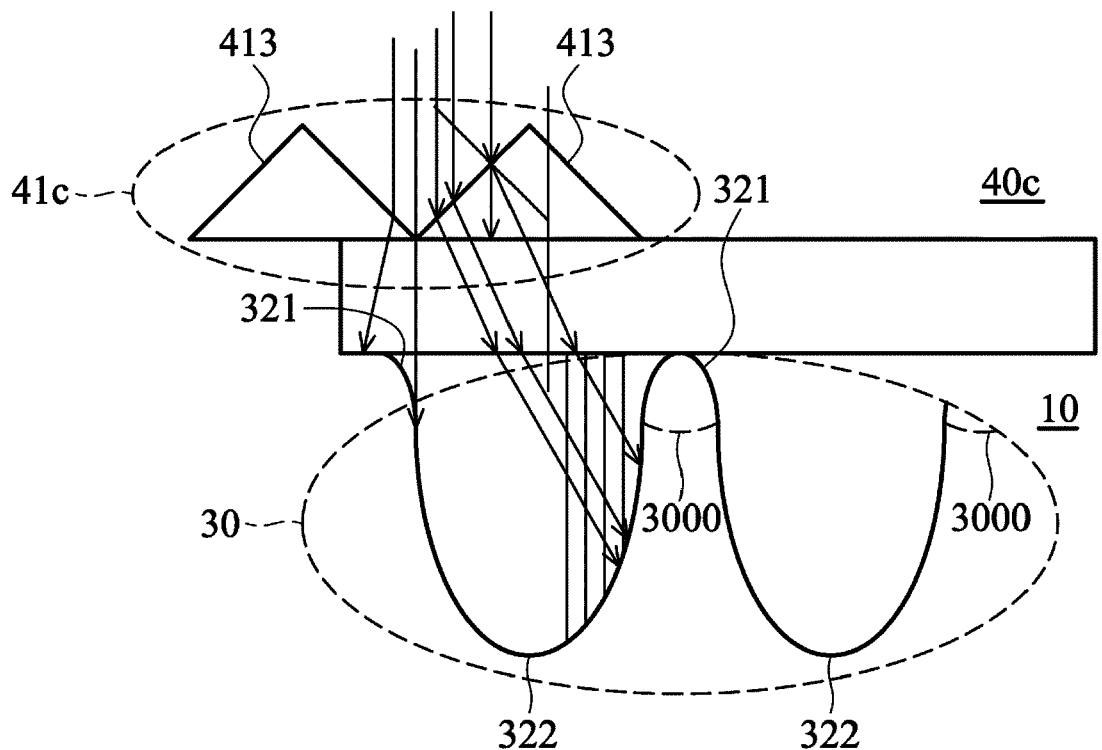
FIG. 9 depicts an optical path of prisms as a refraction structure facing a light source.

In this embodiment, the refraction element is disposed above the light guiding film. The refraction structure of the refraction element faces the light source or the light diffusion structure formed on the light guiding film. FIG. 6 shows an optical path of micro convex lenses 411 of the refraction structure 411 of the refraction element 40 as the refraction structure 41 facing a light source (not shown). FIG. 7 depicts an optical path of micro concave lenses 412 of a refraction structure 41a of a refraction element 40a as the refraction structure 41a facing a light source (not shown). FIG. 8 depicts an optical path of micro concave lenses 411 of a refraction structure 41b of a refraction element 40b as the refraction structure 41b facing the light diffusion structure 30 of the light guiding film 10. FIG. 9 depicts an optical path of prisms 413 of a refraction structure 41c of a refraction element 40c as the refraction structure 41c facing the light diffusion structure 30 of the light guiding film 10.

Figure 10:
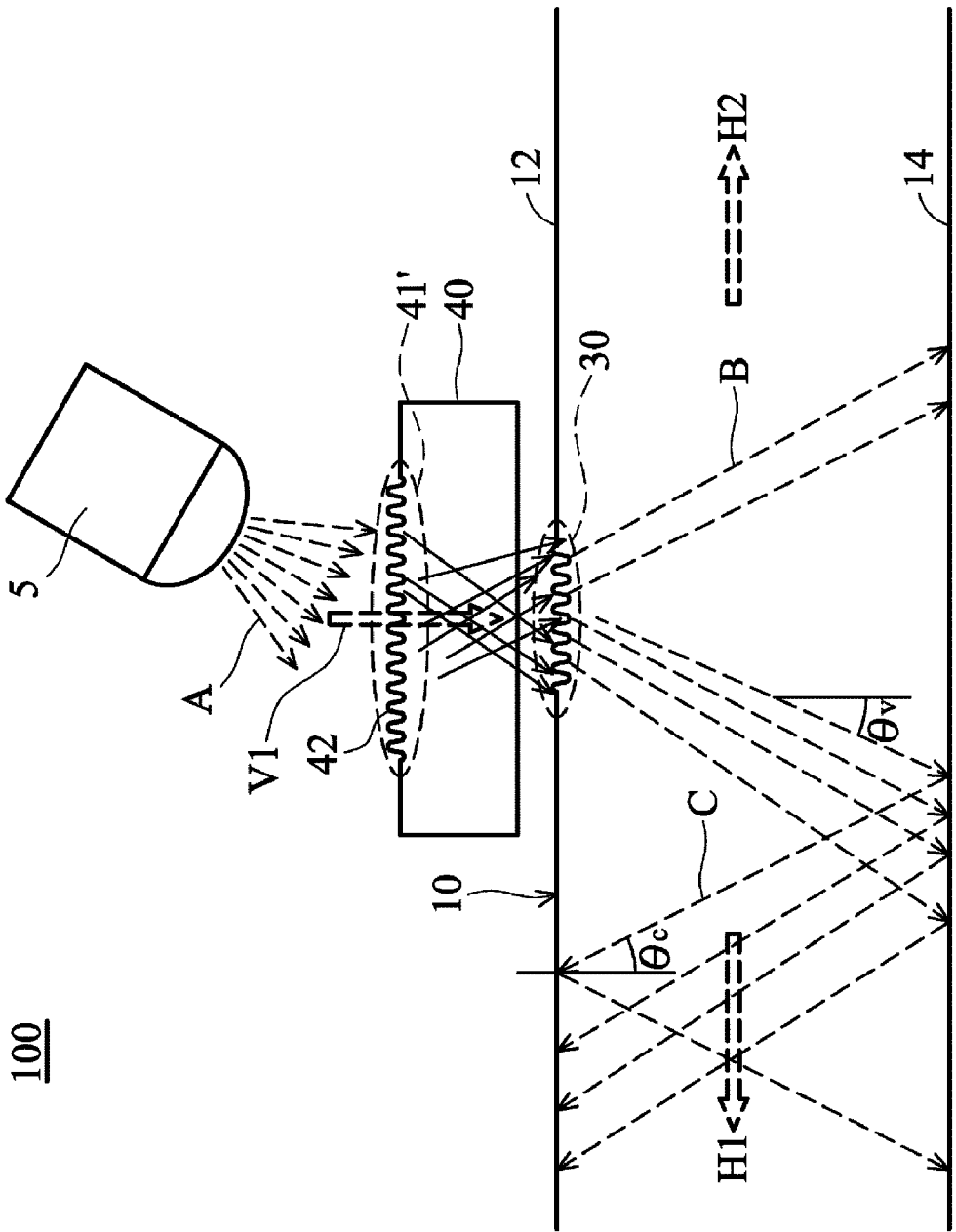
FIG. 10 depicts light from a light source having an angle with respect to the composite light guiding film module.

An embodiment of the invention, the light beams from the light source is perpendicular or inclined to the first surface of the light guiding film. Referring to FIG. 10, light beams from an inclined light source 5 enter the light guiding film 10 with a larger inclined angle than the light beams from a light source 5 in FIG. 3, which aims at the light guiding film 10. The light beams are refracted by the refraction element 40 and pass through the light diffusion structure 30 whereby the light beams propagates in the light guiding film 10 by continuous total reflection, and the first traveling direction V1 of the light beam "A" traveling from the light source 5 toward/into the light diffusion structure 30 of the light guiding film 10 is substantially perpendicular or normal to the second or third traveling direction H1 or H2 of the light beam propagating within the light guiding film 10.

In Table 1, the light intensity of a film without light diffusion film is set to be 1 (standard), as described in the second to last column, wherein the light source is a red laser source with wavelength of 650 nm. The light intensity of light guiding film with light diffusion structure is 6.6 times than without it. The last column describes the light intensity of the light guiding film with a refraction element. The light intensity of the light guiding film without a refraction element is set to be 1. The maximal light intensity can be up to 1.8 times. The light guiding film with a refraction element has larger efficiency of light guiding.

A light outgoing structure (not shown in FIGs.) can be formed on the first surface or the second surface of the light guiding film. The light beams propagating in the light guiding film escape therefrom via the light outgoing structure. The light outgoing structure can be micro lenses, inversed prisms, dots, holes or rough structures.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

TABLE 1

| 650 nm Red laser | PC light guiding film of thickness 0.254 mm | Micro concave lens (B) | Micro convex lens (C) | Diffusion film (T90%, haze 88%) (D) | Prism sheet (E) | Power of laser (W) | Ratio of light intensity by single light guiding film | Ratio of light intensity by light guiding film module |
|---|---|---|---|---|---|---|---|---|
| Background Value (dark room) | — | | | | | $2.4 \times 10^{-8}$ | | |
| Light guiding film without light diffusion structure | No | | | | | $1.2 \times 10^{-6}$ | 1 | |
| Single light guiding film with light diffusion structure | Yes | | | | | $7.9 \times 10^{-6}$ | 6.6 | 1 |
| Multiple structure (no alignment) | | | | | | | | |
| (A) + (B) | Yes | Face-up disposed | | | | $12.2 \times 10^{-6}$ | | 1.5 |
| (A) + (B) | Yes | Face-down disposed | | | | $9.1 \times 10^{-6}$ | | 1.1 |
| (A) + (C) | Yes | | Face-up disposed | | | $14.1 \times 10^{-6}$ | | 1.8 |
| (A) + (D) | Yes | | | Yes | | $11.4 \times 10^{-6}$ | | 1.4 |
| (A) + (E) | Yes | | | | Yes | $14.3 \times 10^{-6}$ | | 1.8 |

What is claimed is:

1. A composite light guiding film module, comprising:

a light guiding film comprising a first surface and a light diffusion structure disposed on the first surface, wherein the light diffusion structure comprises a plurality of identical micro convex lenses and a plurality of identical micro concave lenses which are arranged in a periodic, alternating and continuous manner in a first direction and a second direction to form a two dimensional array, each of the plurality of micro concave lenses is peripherally interfaced with a part of the plurality of micro convex lenses at a junction area therebetween, and a curvature of each of the plurality of concave lens and a curvature of the junction area located between the plurality of micro convex lenses and the plurality of concave lenses are not equal to zero; and a refraction element comprising at least one refraction structure, wherein a light beam from a light source passes through the at least one refraction structure of the refraction element and is refracted to the light diffusion structure of the light guiding film, wherein the light beam passing through the light diffusion structure of the light guiding film is refracted into the light guiding film and then propagates in the light guiding film by total reflection, and wherein a traveling direction of the light beam traveling from the light source toward the light diffusion structure of the light guiding film is substantially perpendicular to a traveling direction of the light beam propagating within the light guiding film.

2. The composite light guiding film module as claimed in claim 1, wherein the refraction element is disposed above the light guiding film.

3. The composite light guiding film module as claimed in claim 1, wherein the at least one refraction structure of the refraction element comprises at least one micro concave lens, and the light beam from the light source passes through the at least one micro concave lens of the at least one refraction structure of the refraction element and is refracted into the light diffusion structure of the light guiding film.

4. The composite light guiding film module as claimed in claim 2, wherein the at least one refraction structure of the refraction element faces either the light source or the light diffusion structure of the light guiding film.

5. The composite light guiding film module as claimed in claim 1, wherein the at least one refraction structure of the refraction element comprises at least one micro convex lens, and the light beam from the light source passes through the at least one micro convex lens of the at least one refraction structure of the refraction element and is refracted into the light diffusion structure of the light guiding film.

6. The composite light guiding film module as claimed in claim 1, wherein the at least one refraction structure of the refraction element comprises at least one prism, and the light beam from the light source passes through the prism of the at least one refraction structure of the refraction element and is refracted into the light diffusion structure of the light guiding film.

7. The composite light guiding film module as claimed in claim 1, wherein the light guiding film further comprising a second surface, and the light beam passes through the first surface to enter the light guiding film and propagates in it between the first and second surfaces by total reflection.

8. The composite light guiding film module as claimed in claim 7, wherein the light beam traveling from the light source is perpendicular or inclined to the first surface of the light guiding film.

9. The composite light guiding film module as claimed in claim 1, wherein the first direction is substantially perpendicular to the second direction.

10. The composite light guiding film module as claimed in claim 1, wherein the ratio of a width to a depth of each of the plurality of micro concave lens of the light diffusion structure of the light guiding film is not greater than two.

11. The composite light guiding film module as claimed in claim 1, wherein a depth of the plurality of micro concave lens of the light diffusion structure of the light guiding film is smaller than a thickness of the light guiding film.

12. The composite light guiding film module as claimed in claim 7 further comprising a light outgoing structure formed on the first surface or the second surface of the light guiding film, wherein the light beam propagating in the light guiding film exits the light guiding film via the light outgoing structure.

13. The composite light guiding film module as claimed in claim 1, wherein the refraction element comprises Multi-layered refraction structures.

14. The composite light guiding film module as claimed in claim 1, wherein the refraction element comprises multiple stacked refraction sheets.

15. The composite light guiding film module as claimed in claim 1, wherein each of the plurality of micro concave lenses is peripherally interfaced with four of the plurality of micro convex lenses at the junction area located therebetween.

16. The composite light guiding film module as claimed in claim 1, wherein the curvature of each of the plurality of concave lens and the curvature of the junction area located between the plurality of micro convex lenses and the plurality of concave lenses are different.

17. A composite light guiding film module, comprising:
a light guiding film comprising a first surface and a light diffusion structure disposed on the first surface, wherein the light diffusion structure comprises a plurality of identical micro convex lenses and a plurality of identical micro concave lenses which are arranged in a periodic, alternating and continuous manner in a first direction and a second direction to form a two dimensional array, each of the plurality of micro convex lenses is peripherally interfaced with a part of the plurality of micro concave lenses at a junction area located therebetween, and a curvature of each of the plurality of concave lens and a curvature of the junction area located between the plurality of micro convex lenses and the plurality of concave lenses are not equal to zero; and
a refraction element comprising at least one refraction structure, wherein a light beam passes through the refraction element and is refracted to the light diffusion structure of the light guiding film,
wherein the light beam passing through the light diffusion structure of the light guiding film is refracted into the light guiding film and then propagates in the light guiding film by total reflection, and
wherein a traveling direction of the light beam traveling toward the light diffusion structure of the light guiding film is substantially perpendicular to a traveling direction of the light beam propagating within the light guiding film.

18. The composite light guiding film module as claimed in claim 17, wherein each of the plurality of micro convex lenses is peripherally interfaced with four of the plurality of micro concave lenses at the junction area located therebetween.

19. The composite light guiding film module as claimed in claim 17, wherein the curvature of each of the plurality of concave lens and the curvature of the junction area located between the plurality of micro convex lenses and the plurality of concave lenses are different.

* * * * *